US012583321B2

(12) United States Patent
LaBar et al.

(10) Patent No.: US 12,583,321 B2
(45) Date of Patent: Mar. 24, 2026

(54) INTEGRATED SLIDE-OUT VEHICLE WORK SURFACE

(71) Applicant: Volkswagen Aktiengesellschaft, Wolfsburg (DE)

(72) Inventors: Brett LaBar, Pleasanton, CA (US); Alexander Ksoll, Encino, CA (US); William Brian Lathrop, San Jose, CA (US); Armin Fatic, Foster City, CA (US)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 18/677,672

(22) Filed: May 29, 2024

(65) Prior Publication Data

US 2025/0368044 A1 Dec. 4, 2025

(51) Int. Cl.
| | |
|---|---|
| *B60K 35/53* | (2024.01) |
| *B60K 35/10* | (2024.01) |
| *B60K 35/22* | (2024.01) |
| *B60K 35/81* | (2024.01) |
| *B60N 3/00* | (2006.01) |
| *G06F 3/041* | (2006.01) |
| *G06F 3/044* | (2006.01) |

(52) U.S. Cl.
CPC .............. *B60K 35/53* (2024.01); *B60K 35/10* (2024.01); *B60K 35/223* (2024.01); *B60K 35/81* (2024.01); *B60N 3/001* (2013.01); *G06F 3/0416* (2013.01); *G06F 3/044* (2013.01); *B60K 2360/1438* (2024.01); *B60K 2360/332* (2024.01); *G06F 2203/04102* (2013.01)

(58) Field of Classification Search
None
See application file for complete search history.

(56) References Cited

U.S. PATENT DOCUMENTS

| | | | | |
|---|---|---|---|---|
| 9,428,118 | B1 * | 8/2016 | Rawlinson | B60N 3/001 |
| 2014/0098075 | A1 * | 4/2014 | Kwak | G09G 3/2003 |
| | | | | 345/204 |
| 2018/0201204 | A1 * | 7/2018 | Saitou | B60R 11/0229 |
| 2022/0083218 | A1 | 3/2022 | Park et al. | |

(Continued)

FOREIGN PATENT DOCUMENTS

WO 2023036781 A1 3/2023

*Primary Examiner* — Christopher R Lamb
(74) *Attorney, Agent, or Firm* — Peter Zura; LOZA & LOZA, LLP

(57) ABSTRACT

A retractable work surface apparatus for a vehicle includes a plurality of guiderails installed within the vehicle's dashboard. Each guiderail features a curved portion with a specified radius extending downward from the dashboard's front surface toward its inner region. The apparatus further comprises a work surface assembly moveably coupled to the guiderails. The work surface assembly includes a structural support layer and a flexible touchscreen layer disposed on the support layer, configured to receive user input. A plurality of telescoping rails, each slidably coupled to the work surface assembly and aligned with the guiderails, facilitate the extension and retraction of the work surface assembly. The telescoping rails enable the work surface assembly to extend beyond the dashboard's front surface to a use position and retract into a stowed position within the dashboard.

20 Claims, 4 Drawing Sheets

(56)               References Cited

U.S. PATENT DOCUMENTS

2023/0373371 A1*  11/2023  Coache ................. B60N 3/001
2024/0025322 A1*   1/2024  Salter ..................... B62D 25/14
2024/0359557 A1*  10/2024  Wall ....................... B60K 35/55

* cited by examiner

100

102A

112A

104A

106

102B

108

112B

104B

110

120

130

Processor/
Control

INTEGRATED SLIDE-OUT VEHICLE WORK SURFACE

TECHNICAL FIELD

The present disclosure relates to automotive interiors, and more particularly to ergonomic and utility enhancements in vehicle workstations.

BACKGROUND

The increasing demand for multifunctional spaces within vehicles is a consequence of several evolving trends in society and technology. As urban commuting times increase and autonomous driving technology advances, vehicle interiors are being reimagined as mobile offices or living spaces rather than merely transit compartments. This shift necessitates interiors that can adapt to various activities such as working, meeting, and resting.

Current vehicle designs typically incorporate static and inflexible interiors that are primarily optimized for driving and passenger comfort, focusing mainly on seating and storage. Work-related features in these vehicles are generally limited to foldable trays or integrated stands, which are often cramped, ergonomically unsound, and insufficient for prolonged use. These traditional designs fail to meet the needs of modern drives who require a more functional and comfortable environment for working on the go.

Moreover, existing solutions for vehicle workstations do not adequately address the varied functional needs of users, including the integration of touch-screen surfaces into vehicle. Existing configurations often lack the capability to adjust to driver or passenger seating positions, which can lead to physical discomfort and decreased productivity. The fixed nature of current designs also means that these workstations cannot be easily retracted or stowed away, leading to a permanent reduction in the available interior space for other uses.

Some of the main deficiencies of current designs are their lack of flexibility and poor ergonomic support. Workstations that are too small or rigid limit user activity and comfort. The space occupied by permanent fixtures reduces the vehicle's overall utility, as these cannot be easily stowed away. Moreover, the lack of integration with vehicle technology restricts the functionality of these workstations, preventing them from leveraging the vehicle's connectivity and power systems for enhanced productivity.

SUMMARY

The technologies and techniques disclosed herein addresses at least some of these deficiencies by introducing a slide-out surface or work desk integrated within a vehicle's dashboard. This innovative surface is designed to be retractable, thereby preserving the vehicle's interior space when not in use. Its touch-sensitive surface transforms the desk into a dynamic, interactive platform suitable for various digital tasks, from controlling in-vehicle functions to accessing online resources. By seamlessly integrating with the vehicle's existing electrical and data systems, the work surface ensures easy connectivity and immediate access to power, enriching the user experience and extending the desk's utility.

Through these enhancements, the invention fundamentally improves the functionality and comfort of vehicle interiors, making it an ideal solution for both traditional and autonomous vehicles, and thus represents a significant advancement over the prior art.

In some examples, a retractable work surface apparatus for a vehicle is disclosed, comprising: a plurality of guiderails, each configured to be installed within a dashboard of a vehicle, wherein each guiderail comprises a curved portion having a specified radius that extends downward from a front surface region of the dashboard toward an inner region of the dashboard; a work surface assembly moveably coupled to and guided by the plurality of guiderails, the work surface assembly comprising: a structural support layer; a flexible touchscreen layer disposed on the structural support layer, wherein the flexible touchscreen layer is configured to receive input from a user; and a plurality of telescoping rails, each rail slidably coupled to a respective side of the work surface assembly and aligned with one of the plurality of guiderails, wherein each telescoping rail is configured to facilitate extension and retraction of the work surface assembly relative to the dashboard, and wherein the telescoping rails are configured to allow the work surface assembly to extend beyond the front surface region of the dashboard to a use position and to retract into a stowed position within the dashboard.

In some examples, a vehicle is disclosed, comprising: a dashboard; a retractable work surface apparatus integrated within the dashboard, the apparatus comprising: a plurality of guiderails, each installed within the dashboard, wherein each guiderail comprises a curved portion having a specified radius that extends downward from a front surface region of the dashboard toward an inner region of the dashboard; a work surface assembly moveably coupled to and guided by the plurality of guiderails, the work surface assembly comprising: a structural support layer; a flexible touchscreen layer disposed on the structural support layer, wherein the flexible touchscreen layer is configured to receive input from a user; and a plurality of telescoping rails, each rail slidably coupled to a respective side of the work surface assembly and aligned with one of the plurality of guiderails, wherein each telescoping rail is configured to facilitate extension and retraction of the work surface assembly relative to the dashboard, and wherein the telescoping rails are configured to allow the work surface assembly to extend beyond the front surface region of the dashboard to a use position and to retract into a stowed position within the dashboard.

In some examples, a retractable work surface apparatus for a vehicle is disclosed, comprising: a plurality of guiderails, each configured to be installed within a dashboard of a vehicle, wherein each guiderail comprises a curved portion having a specified radius that extends downward from a front surface region of the dashboard toward an inner region of the dashboard; a work surface assembly moveably coupled to and guided by the plurality of guiderails, the work surface assembly comprising: a structural support layer; a flexible touchscreen layer disposed on the structural support layer, wherein the flexible touchscreen layer is configured to receive input from a user; a protective surface layer configured over a top surface of the flexible touchscreen layer, wherein the protective surface layer comprises a composite material configured to permit flexural deformation sufficient to conform to the curvature of the guiderails; a plurality of telescoping rails, each rail slidably coupled to a respective side of the work surface assembly and aligned with one of the plurality of guiderails, wherein each telescoping rail is configured to facilitate extension and retraction of the work surface assembly relative to the dashboard, and wherein the telescoping rails are configured to allow the work surface assembly to extend beyond the front surface region of the dashboard to a use position and to retract into a stowed position within the dashboard.

The detailed description and accompanying drawings that follow will provide an in-depth understanding of the slide-out surface, its operational advantages, and its potential applications in the field of vehicle interiors.

BRIEF DESCRIPTION OF THE FIGURES

The present invention is illustrated by way of example and not limitation in the figures of the accompanying drawings, in which like references indicate similar elements and in which.

DETAILED DESCRIPTION

Figure 1:
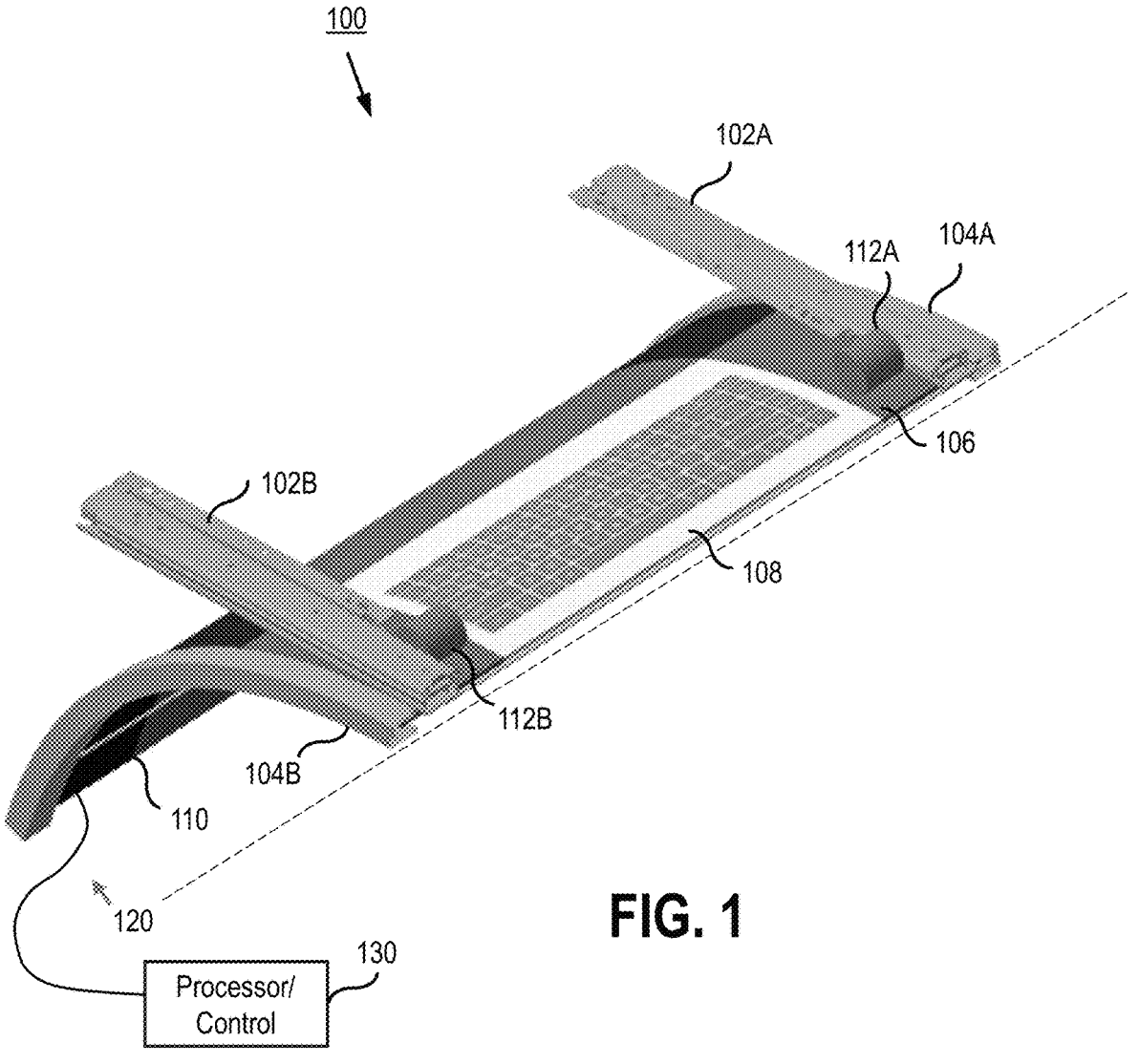
FIG. 1 illustrates a work surface in a retracted position within a vehicle dashboard, wherein the work surface is supported by left and right guides and mounted on left and right rails configured with associated roller guides according to some aspects of the present disclosure.

The figures and descriptions provided herein may have been simplified to illustrate aspects that are relevant for a clear understanding of the herein described devices, structures, systems, and methods, while eliminating, for the purpose of clarity, other aspects that may be found in typical similar devices, systems, and methods. Those of ordinary skill may thus recognize that other elements and/or operations may be desirable and/or necessary to implement the devices, systems, and methods described herein. But because such elements and operations are known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

Exemplary embodiments are provided throughout so that this disclosure is sufficiently thorough and fully conveys the scope of the disclosed embodiments to those who are skilled in the art. Numerous specific details are set forth, such as examples of specific components, devices, and methods, to provide this thorough understanding of embodiments of the present disclosure. Nevertheless, it will be apparent to those skilled in the art that specific disclosed details need not be employed, and that exemplary embodiments may be embodied in different forms. As such, the exemplary embodiments should not be construed to limit the scope of the disclosure. In some exemplary embodiments, well-known processes, well-known device structures, and well-known technologies may not be described in detail.

The terminology used herein is for the purpose of describing particular exemplary embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The steps, processes, and operations described herein are not to be construed as necessarily requiring their respective performance in the particular order discussed or illustrated, unless specifically identified as a preferred order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another element, component, region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the exemplary embodiments.

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Turning to FIG. 1, the drawing illustrates a retractable work surface system 100 in a retracted position within a vehicle dashboard (120; see ref. 402, FIG. 4), wherein the work surface (106, 108, 110) is supported by right (104A) and left (104B) guides and mounted on right (102A) and left (102B) rails configured with associated roller guides (112A, 112B) according to some aspects of the present disclosure. The retractable work surface 100 may be integrated within the dashboard (120) of a vehicle, and configured to enhance the interior functionality for occupants, particularly in scenarios where a workspace within the vehicle is desired.

In some examples, the work surface is configured as a multi-layer surface, discussed in greater detail below in connection with FIG. 3, and may comprise a first layer 106 (protective surface layer), second layer 108 (protective surface layer) and third layer 110 (structural support layer), mounted on a pair of telescopic rails (102A, 102B) that facilitate horizontal movement. Each rail may be configured from a durable material such as stainless steel or aluminum to withstand repeated use and the mechanical stresses of movement. Each rail includes a roller guide (112A, 112B), which consists of high-density polyethylene or a similar low-friction material to ensure the work surface moves smoothly without binding or excessive wear.

In some examples, each telescoping rail (102A, 102B) may include an outer rail mounted to a fixed structure, such as the vehicle's dashboard framework to serves as the guide and support for the inner rails. One or more inner rails may be configured to slide within the outer rail, and, in some configurations, multiple nested rails (two or three stages) may be used to extend significantly beyond the length of the outer rail when fully deployed. Ball bearings or rollers may be positioned between the rails to facilitate smooth and low-friction movement between the fixed outer rail and the sliding inner rails. The ball bearings may be organized in ball cages for even distribution and to prevent skewing during movement. Each telescoping rail (102A, 102B) may include end stops and retainers to prevent the inner rail from disengaging completely from the outer rail. They also absorb impacts at the maximum extension and retraction points, reducing wear and noise. A locking mechanism may also be configured on each telescoping rail (102A, 102B) to prevent unintentional extension or retraction. Locks can be mechanically or electronically controlled, depending on the level of automation required.

Each telescoping rail (102A, 102B) should be configured to withstand a range of temperatures typical for vehicle interiors, from freezing conditions to extreme heat when vehicles are exposed to sunlight. Special lubricants may be used that can maintain viscosity and lubricating properties across these extremes. Thermal expansion can be an issue, especially for metal components, so tolerances and materials should be configured to accommodate or minimize expansion effects. Advanced coatings, such as Teflon or other non-stick, corrosion-resistant coatings, may be applied to reduce friction further and protect against environmental damage such as rust or corrosion from moisture.

The left guardrail (104B) and right guardrail (104A) are configured to allow the retractable work surface system to be integrated within the dashboard 120 of a vehicle. These guardrails should be configured to conform seamlessly to the interior contours of the dashboard, aligning with ergonomic requirements while providing structural support and guidance for the movement of the work surface (106, 108, 110). In some examples, each guardrail 104A, 104B, positioned on respective sides of the dashboard and work surface (106, 108, 110), may be configured with an elongated curved profile to maximize space efficiency. As can be seen in the figure, each guiderail comprises a curved portion having a specified radius that extends downward from a front surface region of the dashboard toward an inner region of the dashboard. The contour of each guardrail should be shaped to fit behind the dashboard, mimicking its curvature and ensuring a discreet integration without disrupting the overall dashboard layout. The edges of each guardrail 104A, 104B may be tapered and configured with a curvature to facilitate an easier transition and interface with dashboard grooves.

This tapered and curved design may enhance the case with which the guardrails can be installed and minimizes visual disruption.

The inner facing side of each guardrail 104A, 104B may be configured with a longitudinal slot, running at least a portion of the entire length, which serves as the track for the roller guides attached to the work surface. This slot should advantageously facilitate the smooth extension and retraction of the work surface 106, 108, 110. Machining of the slot should be configured to fit for work surface roller guides, preventing any lateral movement or misalignment that could impact the stability or levelness of the work surface during operation. To further enhance the movement, the interior surface of the slot may be lined with a low-friction material, such as Teflon or nylon, which reduces resistance and wear, thereby extending the functional life of the entire mechanism.

The guardrails may be constructed from any suitable material including, but not limited to, high-strength aluminum or stainless steel. Aluminum offers the advantage of being lightweight and corrosion-resistant, suitable for complex shapes and finishes, including anodization for improved surface hardness. Stainless steel provides exceptional strength and resistance to deformation under repetitive use, making it advantageous for applications requiring maximal durability. Alternatively, for applications where weight is a factor, advanced composite materials like carbon fiber reinforced polymers could be employed to achieve a favorable stiffness-to-weight ratio. For installation, the guardrails 104A, 104B may be configured to integrate easily into the vehicle dashboard with minimal structural modification required. Fasteners used for mounting may be concealed within the dashboard's contours or could be secured using high-strength automotive adhesives that ensure a durable and secure bond without necessitating visible screws or bolts.

In some examples, the work surface may be configured as a plurality of layered components comprising a top, middle, and bottom layers (106, 108, 110) (also referred to herein as "first", "second" and "third" layers), where the top layer is configured as a protective surface layer, the middle layer is configured as a flexible touchscreen layer, and the bottom layer is configured as a structural support layer. As will be explained in greater detail below in connection with FIG. 3, the top layer (106) may be fabricated from a robust, flexible material suitable for a protective surface. The middle layer (108) may be configured as a flexible touchscreen surface suitable for receiving user inputs (e.g., touch inputs). The structural support layer 110 may be configured to provide structural support and may be formed from a composite material that combines strength with flexibility, allowing the work surface to withstand the dynamic loads experienced during vehicle operation.

The retractable work surface apparatus 100 may also be configured with a processor/control device 130 configured to communicate with the flexible touchscreen, integrated into the middle layer (108) of the retractable work surface system, and be configured to manage operations. In some examples, the processor/control apparatus 130 may be configured to dynamically render and adjust various interactive interfaces on the flexible touchscreen (108) embedded within the work surface. The processor/control apparatus 130 may be configured to generate a range of user interface layouts, including touch-screen keyboard layouts, where different keyboard configurations or interfaces can be displayed on the touchscreen, depending on user needs or preferences, accommodating various language layouts or ergonomic designs. The processor/control apparatus 130 may also be configured to generate touchpad layouts, where a touchpad interface can be rendered on the flexible touchscreen, providing users with a familiar and responsive means of cursor control and gesture inputs. These interface options are rendered with the intention of providing clarity and stability, ensuring that the visual representations are aligned with the physical properties of the flexible touchscreen, particularly when it is in a fully extended and operational state. In some examples, the processor/control apparatus 130 may be configured to transmit digital content (e.g., text, images, video, etc.) alternately or in addition to the interface layouts, directly to the screen of the touchscreen for viewing and interaction by the user.

In some examples, to ensure that the touchscreen 108 is only interactive when beneficial for the user, the processor/control apparatus 130 may be configured to calibrate touch sensitivity one the flexible touchscreen surface 108 based on display state, where the processor actively manages the touch sensitivity settings, which are calibrated to ensure optimal responsiveness only when the work surface is fully extended. This calibration takes into account any curvature at the full extension to ensure that touch inputs are precisely registered. The processor/control apparatus 130 may be configured to deactivate touch functionality during retraction to prevent unintended inputs and conserve power, where at least some touch functions are deactivated when the work surface is not in a fully extended position. This approach prevents any accidental activation or interaction during the movement phases of the work surface.

In some examples, the processor/control apparatus 130 may be configured to perform synchronization with mechanical movements for the retractable work surface (106, 108, 110) and coordinate mechanical actions of the retractable work surface (106, 108, 110) with the operational status of the touchscreen. Combined with motorized mechanisms (which may separate or integrated with processor/control apparatus 130), the processor/control apparatus 130 may be configured for automated extension and retraction, where a processor controls the motorized mechanisms that extend and retract the work surface. This may ensure that these movements are synchronized with the activation and deactivation of the touchscreen functionalities. The processor/control apparatus 130 may also be configured for safety and operational protocols that manage the operational state of the touchscreen. For example, ensuring the touch interface is active only when the surface is safely and fully extended, and inactive when being retracted to avoid any damage to the flexible components or unintended interactions. Alternately or in addition, the processor/control apparatus 130 may be configured for software and firmware management, where the processor may be equipped with software and firmware that supports the unique functionalities of a flexible, retractable touchscreen system. Regular firmware updates may be provided to improve the responsiveness of the touch interface, introduce new layouts, or refine existing ones to enhance user experience. The processor may include diagnostic tools that monitor the status of the flexible display and the integrity of touch functions, alerting to potential issues and ensuring maintenance of optimal performance.

As is shown in the figure, the processor/control apparatus 130 may be operatively coupled to the retractable work surface 106, 108, 110 via a wired connection in order to communicate data and/or provide control signals for extending and retracting the work surface via a motor, as discussed above. In some examples, the processor/control apparatus may be configured to communicate wirelessly with the work surface 106, 108, 110 via one or more suitable wireless protocols (e.g., Bluetooth, Wi-Fi, 5G, etc.).

Figure 2:
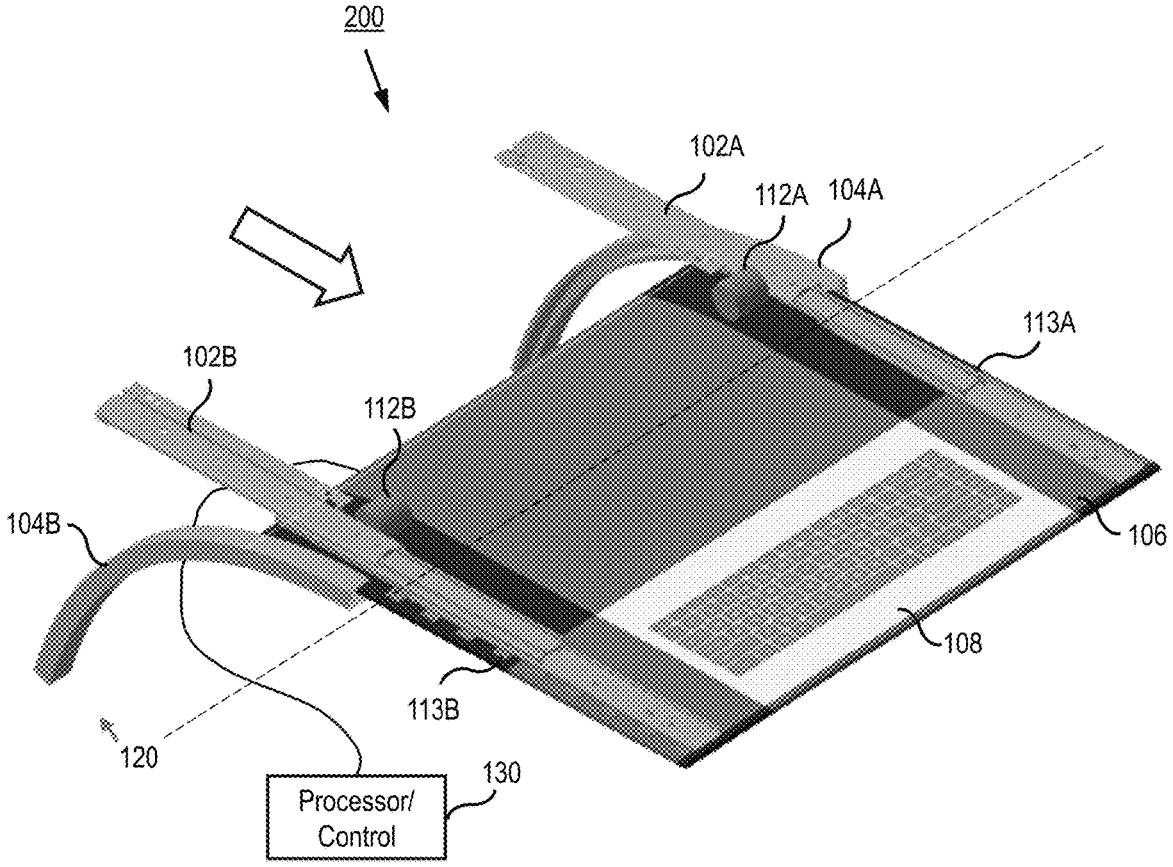
FIG. 2 illustrates the work surface of FIG. 1 in an extended position and illustrates an exemplary movement mechanism facilitated by the rails and roller guides, according to some aspects of the present disclosure.

FIG. 2 illustrates the work surface of FIG. 1 in an extended position and illustrates an exemplary movement mechanism facilitated by the rails and roller guides, according to some aspects of the present disclosure. FIG. 2 illustrates the fully extended position of the work surface (as indicated by the large directional arrow) relative to the vehicle's dashboard 120. The figure illustrates the mechanical action of the work surface as it extends outward from its stowed position within the dashboard 120 to its fully deployed state, aligning with the front edge of the dashboard.

The work surface, comprised of layers 106 (top layer), 108 (middle, touch-sensitive layer), and 110 (support layer), is shown in a position fully extended from the dashboard 120. The extension is facilitated by the left and right rails (102A, 102B) which guide the work surface smoothly from the retracted position inside the dashboard to the position shown. Roller guides (112A, 112B), configured on ends of the work surface, stabilize and guide the work surface as it travels along the rails, providing catch and release functionality between the telescoping and the curved portions of the rail. In one example, the work surface is equipped with magnetic inserts that attach to the telescopic rail as it extends. The roller guides 112A 112B, may ensure that the work surface attaches and detaches smoothly into the curved rail and that extension and retraction process are aligned, preventing any skewing or misalignment.

As the work surface reaches its full extension, the back of the work surface substantially aligns with the front of the dashboard, indicated by the dotted line (120). This alignment ensures that the work surface provides a stable and ergonomic platform for the user. The guide mechanisms 104A, 104B, including the rails 102A, 102B and roller guides 112A, 112B, maintaining the horizontal alignment of the work surface, ensuring that it extends straight forward without deviation. In some examples, upon reaching the fully extended position, the middle layer (108), which incorporates touch-sensitive technology, may become fully operational. The processor/control apparatus 130, activates the touch functionalities and prepares the display for user interaction. This activation may be synchronized with the mechanical extension to ensure that the touch interface is only active when the work surface is securely in place and ready for use, enhancing safety and usability.

Figure 3:
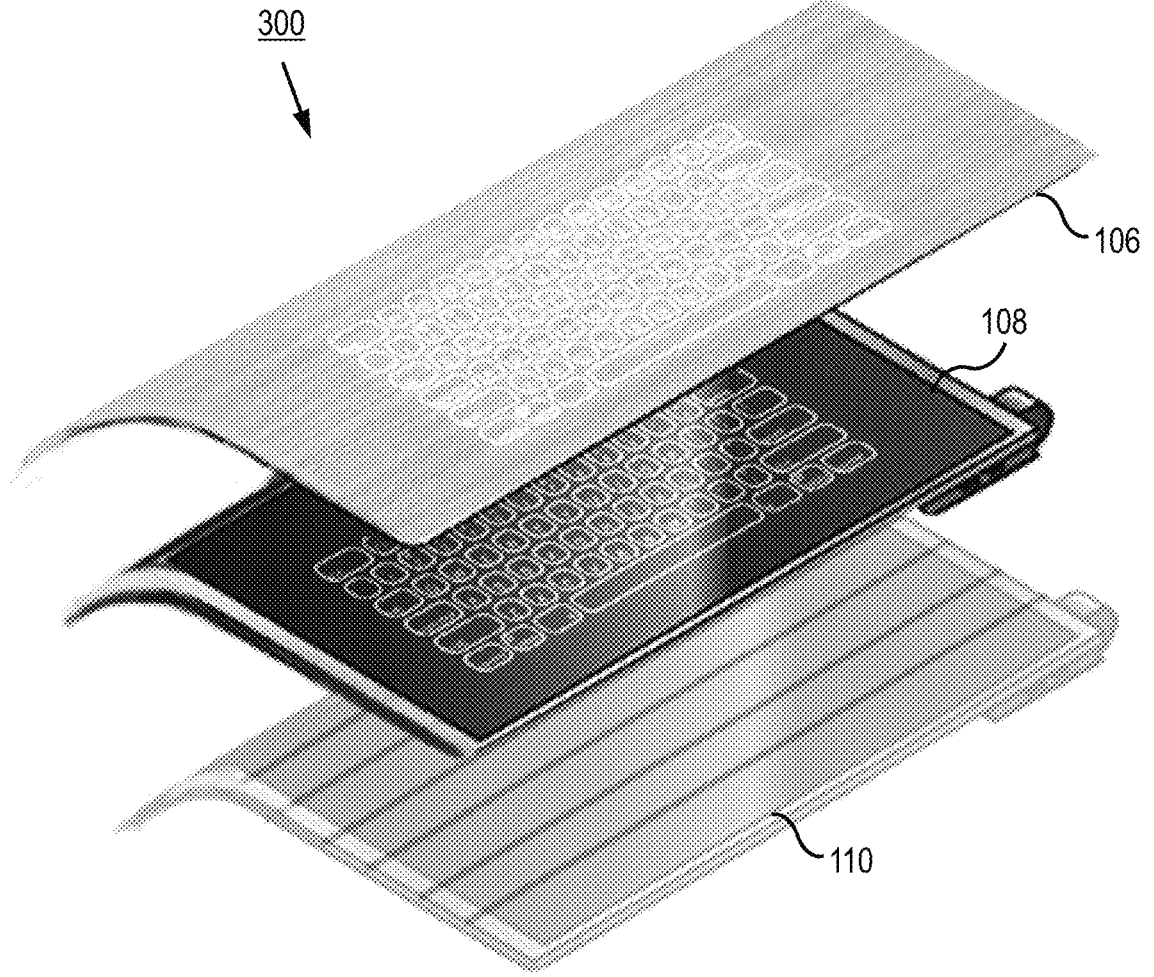
FIG. 3 presents an exploded view of the work surface, detailing the layering of the components, wherein a first layer may function as a protective cover or interface, a second layer features a touch-sensitive surface, and a bottom layer provides structural support, according to some aspects of the present disclosure.

Turning to FIG. 3, the drawing presents an exploded view of the work surface, detailing the layering of the components, wherein a protective surface layer 106 may function as a protective cover or interface, a second layer 108 features touch-sensitive technology, and a bottom layer provides structural support 110, according to some aspects of the present disclosure. As discussed above, given the requirements for a retractable work surface in a vehicle dashboard that includes bending along a curved path, the material selection and design configuration of the protective surface layer 106 need to accommodate flexibility while maintaining durability and usability.

In some examples, the protective surface layer 106 may be configured from polymer-based composites, such as fiberglass-reinforced plastics (FRP). These materials are made by embedding glass fibers in a polymer matrix, where the fibers provide tensile strength and rigidity, while the polymer matrix allows flexural deformation without fracturing. FRP is highly durable, resistant to environmental degradation. In some examples, the protective surface layer 106 may be configured from carbon fiber-reinforced plastics (CFRP). Similar to fiberglass, but using carbon fibers, CFRP offers superior strength-to-weight ratios and stiffness. it is more expensive than fiberglass but provides better performance where minimal weight and maximum durability are important. In some examples, the protective surface layer 106 may be configured from thermoplastic polymers, such as polycarbonate that possesses impact resistance and clarity. Polycarbonate can be formulated to offer a significant degree of flexibility. It is also highly resistant to temperature variations and can be coated to resist scratches. In some examples, a thin acrylic sheet may be used or an impact-modified acrylic may be used as well. In some examples, bi-stable structures may be used to maintain two distinct shapes and switch between them with minimal force. Incorporating bi-stable materials could allow the work surface to switch between a flat, extended configuration and a compact, curved retracted configuration.

Regarding the flexible touchscreen layer 108, the associated touch-sensitive technology should be configured to be flexible enough to bend along the guardrails (104A, 104B) during the extension and retraction of the work surface. The requirement for flexibility, combined with the need for touch functionality, requires using advanced flexible electronic materials and technologies. In some examples, the flexible touchscreen layer 108 may be configured from flexible Organic Light Emitting Diode (OLEDs) technology. OLEDs are well-suited for this application because they can be manufactured on flexible substrates such as plastic films. Flexible OLEDs are constructed using thin layers of organic materials that emit light when electricity is applied. These layers are deposited on a flexible substrate such as polyethylene terephthalate (PET) or transparent polyimide, allowing the display to bend without impairing its functionality. The OLED components are sealed between this substrate and a flexible encapsulation layer to protect against environmental exposure. In the vehicle dashboard configuration, the OLED display would be configured to match the curvature of the guardrails (104A, 104B) and dashboard when extended and to handle the flexing during retraction. The display may be configured to have minimal bending stress concentration points, optimizing the distribution of stress across the display surface.

In some examples, capacitive touch layers on flexible displays may be utilized, comprising materials like indium tin oxide (ITO) or alternatives like silver nanowires or graphene, which provide excellent conductivity and flexibility. These materials may be applied in a very thin layer to a flexible substrate, allowing them to maintain electrical properties even when bent. In this example, a roll-to-roll process may be used for these materials involving continuously depositing the conductive materials on flexible substrates as they are unrolled, processed, and rerolled. This technique supports mass production and ensures uniformity across large batches, advantageous for automotive applications where consistency and reliability are paramount. The capacitive touch layer may be integrated directly onto a flexible OLED substrate. The connectivity between this integrated touch layer and the device's processor (e.g., 130) may be managed via flexible printed circuits (FPCs) that can withstand bending and twisting without failure.

Depending on the materials used, the flexible touchscreen layer 108 should nevertheless be configured for curvature adaptation and stress management in order to incorporate features to distribute and manage the mechanical stress during bending. Areas expected to undergo the most stress might feature strain-relieving cuts or be made from more elastic materials. The entire display assembly may be encapsulated (alternately or in addition to the protective surface layer 106) in a durable, flexible material that can resist automotive environmental factors such as UV exposure, temperature extremes, and humidity. Flexible Circuit Connections may be used to: Utilize FPCs that provide reliable electrical connections that can flex along with the display and touch components. These circuits may be configured to maintain functionality without disruption over the lifespan of the vehicle. Connections between the flexible display and the rest of the electronic system in the vehicle may be reinforced to prevent detachment or damage during the bending movements.

The structural support layer 110 of the retractable work surface in FIG. 3 is configured to provide robust support for the overlying touch-sensitive middle layer (108) and the top layer (106). In some examples, the structural support layer 110 may comprise multiple individual slats, designed to move slightly relative to each other to accommodate the bending motion as the surface extends or retracts along the curved guardrails 104A, 104B. Each slat should be narrow enough to flex individually, reducing the stress and strain that would occur if a single, rigid piece were used. The slats are aligned in parallel and may be interconnected with flexible joints that allow them to articulate relative to each other. These joints may be advantageous for maintaining structural integrity and uniform support across the surface while enabling the necessary flexibility.

The slats may be configured from high-strength composite materials, such as carbon fiber reinforced polymer or fiberglass reinforced plastic, which offer high strength-to-weight ratios and good flexibility. These materials are also resistant to environmental factors typical in automotive settings, such as temperature fluctuations and moisture. In some examples, each slat may be coated with a wear-resistant finish to protect against scratches, wear, and corrosion, ensuring longevity and maintaining aesthetic quality over time. The slats may be coupled using hinges or flexible rubber or silicone joints that allow for both bending and slight torsional movement. These connections are designed to withstand repeated use while minimizing failure. To assemble the slats into a coherent structure, durable yet flexible fasteners (e.g., stainless steel or high-grade aluminum), may be used. These fasteners are chosen for their corrosion resistance and strength.

The design of the slats and their joints allows the entire structural support layer 110 to conform smoothly to the radius dictated by the guardrails 104A, 104B. This is achieved by conforming the shape to the maximum allowable bend radius for each slat and designing the joints to accommodate this without exceeding the material limits. The slats may be coupled to a frame or directly to the guardrails 104A, 104B via mounting brackets that can flex or pivot slightly. This ensures that the structural alignment is maintained across the bending curve. In some examples, tension cables may be utilized within or alongside the slats. These cables can be adjusted to control the degree of curvature, similar to the system used in adjustable ergonomic chairs, providing additional support and maintaining the desired shape of the structure.

Figure 4:
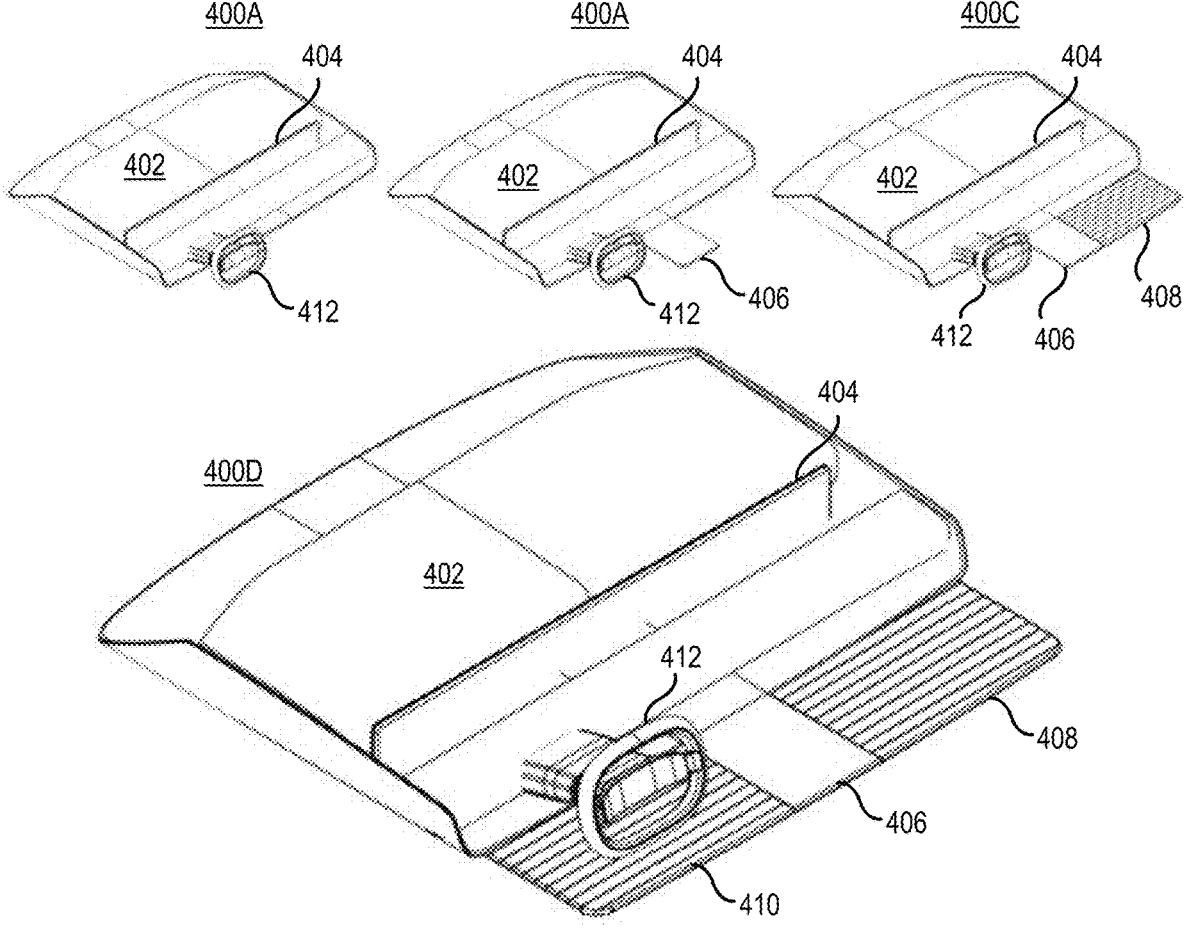
FIG. 4 shows configurations of a mobile productivity and convenience space of a vehicle interior, comprising a work surface in different states of deployment and integration with other vehicle elements, according to some aspects of the present disclosure.

FIG. 4 shows configurations of a mobile productivity and convenience space, comprising work surfaces in different states of deployment and integration with other vehicle elements, according to some aspects of the present disclosure. FIG. 4 depicts various configurations (400A-400D) of a retractable work surface system integrated within a vehicle dashboard 402, illustrating the system in different stages of deployment and usage within a vehicle environment. The figure includes a central supporting console 406 along with driver and passenger work surfaces (410 and 408, respectively), each in varying states of extension and operational readiness. The example includes a central console 406, a primary display 404, and retractable work surfaces 408, 410, where the primary display 404 is configured mainly for content display, while the interactive user tasks are designed to occur on the work surfaces. It should be understood by those skilled in the art that display 404 may also be configured with interactive features as well (e.g., touch-screen functions).

Starting with a fully retracted position illustrated in 400A, in this configuration, a central supporting console 406 is provided, along with a driver side work surface 410 and a passenger side work surface 408, which are shown as fully retracted into the dashboard 402. This position minimizes space utilization within the vehicle cabin, preserving the aesthetic and functional integrity of the vehicle's interior when the work surfaces are not in use. FIG. 400B illustrates the central supporting console 406 extended forward from the dashboard 402. The central supporting console 406 may serves as a mechanical support structure, enhancing the stability of the adjacent work surfaces (408, 410) when deployed. Although not equipped with electronic functionalities such as touchscreens or processing capabilities, the structural design of console 406 may be advantageous for supporting the extended work surfaces.

In the retractable work surface system of FIG. 4, the central console may be configured similarly to the function and configuration of the structural support layer 110 described previously in connection with FIG. 3, although alternate configurations are contemplated in the present disclosure, including displays on external devices (e.g., phone, tablets, laptops, etc.) that are communicatively coupled to a processing apparatus of the vehicle (e.g., 130). The display 404 in this example is integrated within the dashboard 402 or the central console (406) and is primarily used for showing content such as navigation maps, vehicle diagnostics, entertainment options, and other information relevant to the driver and passengers. This display is not primarily touch-sensitive but is configured to deliver high-quality visuals and possibly interact with other vehicle systems.

In the configuration of FIG. 400C, a passenger side work surface 408 (similarly configured as the examples of FIGS. 1-2) is fully extended and activated for use. The extension mechanism utilizes a set of rails and guides (as detailed in previous figures) to ensure smooth movement and stable positioning. Here, the central supporting console 406 aids in stabilizing the extended work surface 408, providing a secure platform suitable for various passenger activities, such as interacting with content on display 404 via work surface 408. Similar to FIG. 400C, FIG. 400D shows the driver side work surface 410 fully extended and operational. This side also benefits from the stabilization provided by central supporting console 406, allowing for safe and stable use of the work surface, even while the vehicle is parked.

The central supporting console 406 and the work surfaces 408, 410 may be mechanically coupled using a combination of hinges, slides, and locking mechanisms that ensure robust attachment and precise alignment. These elements allow for the relative movement necessary for the extension and retraction of the work surfaces while maintaining a high degree of structural integrity when in use. The connection points between the central supporting console 406 and the work surfaces 408, 410 may be equipped with quick-release mechanisms or magnetic locks that facilitate easy and secure attachment or detachment of the work surfaces from the central console 406. This feature allows for flexibility in the configuration and use of the space within the vehicle. Additional stabilization features, such as retractable legs or fold-out supports, may be included in the central console 406 to enhance the load-bearing capacity when the work surfaces are in use. These features may be discretely integrated into the design to maintain the system's aesthetic when retracted.

In some examples, a dual rail system may be utilized within the central console 406 where each work surface 408, 410 comprises dedicated rails that allow for independent movement. This system would also include integrated tracks that align when the central console is extended, facilitating a smooth transition to a combined extension with the console. Guide mechanisms may be used that ensure that when one surface is extended independently, it locks securely into place. When the central console 406 is extended, additional guides engage to provide stability and alignment for the extended work surfaces. In some examples, a control system may be used (e.g., via processor/control apparatus 130) comprising sensors and actuators that manage a sequence of extensions. This system would allow a user to extend the central console first and then the work surfaces, or extend a work surface independently when the console is retracted. A user interface may be provided that allows easy selection of the desired configuration, either extending the surfaces independently or with the console. This may include touch panels, buttons, or remote controls that activate the specific extension mechanism.

Install mechanical interlocks and safety sensors may also be configured to prevent the extension of a work surface 408, 410 if the extension could lead to instability or operational hazards. For example, sensors could prevent the extension of the driver side surface 410 if the central console 406 is not in a position to provide necessary support, or if the vehicle is being driven. Under such a configuration, for example, a passenger may interact directly with various applications, where a passenger work surface 408 may be used as a vehicle interface for more detailed interactions such as adjusting settings, entering navigational data, or other input-intensive tasks, including, but not limited to, internet usage, digital content interaction, etc.

The configurations disclosed herein not only maximizes the use of interior space in a vehicle but also enhances the vehicle's functionality, transforming the vehicle into a mobile office capable of supporting various work-related activities in a comfortable and ergonomically sound manner.

As described above, some or all illustrated features may be omitted in a particular implementation within the scope of the present disclosure, and some illustrated features may not be required for implementation of all examples. In the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A retractable work surface apparatus for a vehicle, comprising:

a plurality of guiderails, each configured to be installed within a dashboard of a vehicle, wherein each guiderail defines a longitudinal slot and comprises a curved portion having a specified radius that extends downward from a front surface region of the dashboard toward an inner region of the dashboard;

a work surface assembly moveably coupled to and guided by the plurality of guiderails, the work surface assembly comprising:

a structural support layer;

a flexible touchscreen layer disposed on the structural support layer, wherein the flexible touchscreen layer is configured to receive input from a user;

one or more roller guides mounted to the work surface assembly and configured to travel within the longitudinal slot of a corresponding guiderail; and a plurality of telescoping rails, each rail slidably coupled to a respective side of the work surface assembly and aligned with a corresponding one of the plurality of guiderails, the telescoping rails being structurally and functionally distinct from the plurality of guiderails, wherein each telescoping rail is configured to facilitate initial linear extension and retraction of the work surface assembly relative to the dashboard, and wherein each telescoping rail is further configured to transfer guidance of the work surface assembly to the curved portion of the corresponding guiderail as the roller guides exit linear guidance and enter and travel within the longitudinal slot of the corresponding guiderail while the work surface assembly moves between a use position and a stowed position, and wherein the telescoping rails are configured to allow the work surface assembly to extend beyond the front surface region of the dashboard to a use position and to retract into a stowed position within the dashboard.

2. The retractable work surface apparatus of claim 1, further comprising a protective surface layer configured over a top surface of the flexible touchscreen layer, wherein the protective surface layer comprises a composite material configured to permit flexural deformation sufficient to conform to the curvature of the guiderails.

3. The retractable work surface apparatus of claim 1, wherein the flexible touchscreen layer comprises at least one of a flexible Organic Light Emitting Diode (OLED) display layer and a flexible capacitive touch layer.

4. The retractable work surface apparatus of claim 1, further comprising a processor/control apparatus operatively coupled to the flexible touchscreen layer, wherein the processor/control apparatus is configured to dynamically render and adjust interactive interfaces on the flexible touchscreen layer, and/or control touch functionality during extension and/or retraction of the work surface.

5. The retractable work surface apparatus of claim 1, further comprising a processor/control apparatus operatively coupled to the flexible touchscreen layer, wherein the processor/control apparatus is configured to communicate inputs from the work surface assembly to a display screen.

6. The retractable work surface apparatus of claim 1, further comprising a central supporting console, configured to be extended and retracted from the dashboard, wherein the central console comprises connection points for coupling the central supporting console with the work surface assembly when extended to the use position.

7. The retractable work surface apparatus of claim 1, wherein each of the plurality of telescoping rails comprise a locking mechanism for locking the work surface assembly in a configured position.

8. A vehicle comprising:

a dashboard;

a retractable work surface apparatus integrated within the dashboard, the apparatus comprising:

a plurality of guiderails, each installed within the dashboard, wherein each guiderail defines a longitudinal slot and comprises a curved portion having a specified radius that extends downward from a front surface region of the dashboard toward an inner region of the dashboard;

a work surface assembly moveably coupled to and guided by the plurality of guiderails, the work surface assembly comprising:

a structural support layer;

a flexible touchscreen layer disposed on the structural support layer, wherein the flexible touchscreen layer is configured to receive input from a user;

one or more roller guides mounted to the work surface assembly and configured to travel within the longitudinal slot of a corresponding guiderail; and a plurality of telescoping rails, each rail slidably coupled to a respective side of the work surface assembly and aligned with a corresponding one of the plurality of guiderails, the telescoping rails being structurally and functionally distinct from the plurality of guiderails, wherein each telescoping rail is configured to facilitate initial linear extension and retraction of the work surface assembly relative to the dashboard, and wherein each telescoping rail is further configured to transfer guidance of the work surface assembly to the curved portion of the corresponding guiderail as the roller guides exit linear guidance and enter and travel within the longitudinal slot of the corresponding guiderail while the work surface assembly moves between a use position and a stowed position, and wherein the telescoping rails are configured to allow the work surface assembly to extend beyond the front surface region of the dashboard to a use position and to retract into a stowed position within the dashboard.

9. The vehicle of claim 8, further comprising a protective surface layer configured over a top surface of the flexible touchscreen layer, wherein the protective surface layer comprises a composite material configured to permit flexural deformation sufficient to conform to the curvature of the guiderails.

10. The vehicle of claim 8, wherein the flexible touchscreen layer comprises at least one of a flexible Organic Light Emitting Diode (OLED) display layer and a flexible capacitive touch layer.

11. The vehicle of claim 8, further comprising a processor/control apparatus operatively coupled to the flexible touchscreen layer, wherein the processor/control apparatus is configured to dynamically render and adjust interactive interfaces on the flexible touchscreen layer, and/or control touch functionality during extension and/or retraction of the work surface.

12. The vehicle of claim 8, further comprising a processor/control apparatus operatively coupled to the flexible touchscreen layer, wherein the processor/control apparatus is configured to communicate inputs from the work surface assembly to a display screen.

13. The vehicle of claim 8, further comprising a central supporting console configured to be extended and retracted from the dashboard, wherein the central console comprises connection points for coupling the central supporting console with the work surface assembly when extended to the use position.

14. The vehicle of claim 8, wherein each of the plurality of telescoping rails comprise a locking mechanism for locking the work surface assembly in a configured position.

15. A retractable work surface apparatus for a vehicle, comprising:

a plurality of guiderails, each configured to be installed within a dashboard of a vehicle, wherein each guiderail defines a longitudinal slot and comprises a curved portion having a specified radius that extends downward from a front surface region of the dashboard toward an inner region of the dashboard;

a work surface assembly moveably coupled to and guided by the plurality of guiderails, the work surface assembly comprising:

a structural support layer;

a flexible touchscreen layer disposed on the structural support layer, wherein the flexible touchscreen layer is configured to receive input from a user;

a protective surface layer configured over a top surface of the flexible touchscreen layer, wherein the protective surface layer comprises a composite material configured to permit flexural deformation sufficient to conform to the curvature of the guiderails;

one or more roller guides mounted to the work surface assembly and configured to travel within the longitudinal slot of a corresponding guiderail; and a plurality of telescoping rails, each rail slidably coupled to a respective side of the work surface assembly and aligned with a corresponding one of the plurality of guiderails, the telescoping rails being structurally and functionally distinct from the plurality of guiderails, wherein each telescoping rail is configured to facilitate initial linear extension and retraction of the work surface assembly relative to the dashboard, and wherein each telescoping rail is further configured to transfer guidance of the work surface assembly to the curved portion of the corresponding guiderail as the roller guides exit linear guidance and enter and travel within the longitudinal slot of the corresponding guiderail while the work surface assembly moves between a use position and a stowed position, and wherein the telescoping rails are configured to allow the work surface assembly to extend beyond the front surface region of the dashboard to a use position and to retract into a stowed position within the dashboard.

16. The retractable work surface apparatus of claim 15, wherein the flexible touchscreen layer comprises at least one of a flexible Organic Light Emitting Diode (OLED) display layer and a flexible capacitive touch layer.

17. The retractable work surface apparatus of claim 15, further comprising a processor/control apparatus operatively coupled to the flexible touchscreen layer, wherein the processor/control apparatus is configured to dynamically render and adjust interactive interfaces on the flexible touchscreen layer, and/or control touch functionality during extension and/or retraction of the work surface.

18. The retractable work surface apparatus of claim 15, further comprising a processor/control apparatus operatively coupled to the flexible touchscreen layer, wherein the processor/control apparatus is configured to communicate inputs from the work surface assembly to a display screen.

19. The retractable work surface apparatus of claim 15, further comprising a central supporting console, configured to be extended and retracted from the dashboard, wherein the central console comprises connection points for coupling the central supporting console with the work surface assembly when extended to the use position.

20. The retractable work surface apparatus of claim 15, wherein each of the plurality of telescoping rails comprise a locking mechanism for locking the work surface assembly in a configured position.

* * * * *